(12) United States Patent
Miyata (10) Patent No.: US 8,294,779 B2
(45) Date of Patent: Oct. 23, 2012

(54) IMAGE SENSING APPARATUS AND STORAGE MEDIUM

(75) Inventor: Akira Miyata, Kodaira (JP)

(73) Assignee: Casio Computer Co., Ltd., Tokyo (JP)

(*) Notice: Subject to any disclaimer, the term of this patent is extended or adjusted under 35 U.S.C. 154(b) by 498 days.

(21) Appl. No.: 12/481,667

(22) Filed: Jun. 10, 2009

(65) Prior Publication Data
US 2009/0322895 A1 Dec. 31, 2009

(30) Foreign Application Priority Data
Jun. 30, 2008 (JP) ................................. 2008-170421

(51) Int. Cl.
*H04N 5/228* (2006.01)
*H04N 5/225* (2006.01)
*H04N 5/235* (2006.01)
*H04N 5/222* (2006.01)

(52) U.S. Cl. ............... 348/222.1; 348/220.1; 348/221.1; 348/333.01

(58) Field of Classification Search ............... 348/222.1, 348/345, 220.1, 221.1, 333.01, 333.11, 333.12, 348/231.99, 239
See application file for complete search history.

(56) References Cited

U.S. PATENT DOCUMENTS

| | | | |
|---|---|---|---|
| 7,365,780 B1 | 4/2008 | Miyazaki | |
| 7,565,116 B2 | 7/2009 | Okuyama et al. | |
| 2005/0231631 A1 | 10/2005 | Miyazaki | |
| 2006/0215041 A1 | 9/2006 | Kobayashi | |
| 2007/0140527 A1* | 6/2007 | Yamamoto et al. | 382/104 |
| 2008/0049137 A1 | 2/2008 | Endo | |
| 2008/0129854 A1* | 6/2008 | Onoda et al. | 348/295 |

FOREIGN PATENT DOCUMENTS

| | | |
|---|---|---|
| JP | 3-265282 A | 11/1991 |
| JP | 11-221309 A | 8/1999 |
| JP | 2002-042139 A | 2/2002 |
| JP | 2002-354335 A | 12/2002 |
| JP | 2004-350187 A | 12/2004 |

(Continued)

OTHER PUBLICATIONS

Extended European Search Report dated Jun. 15, 2010 (in English) issued in counterpart European Application No. 09163536.7.

(Continued)

*Primary Examiner* — Nhan T Tran
*Assistant Examiner* — Yih-Sien Kao
(74) *Attorney, Agent, or Firm* — Holtz, Holtz, Goodman & Chick, PC (57) ABSTRACT

An image sensing apparatus according to this invention includes an image sensing unit which sequentially generates still image data, a holding unit which holds a plurality of still image data, a display unit which displays the still image data, a setting unit which sets a predetermined state as the start timing of shooting by the image sensing unit, a determination unit which determines whether the predetermined state has been obtained, a shooting control unit which causes the image sensing unit to start shooting when the determination unit determines that the predetermined state has been obtained, a display control unit which causes the display unit to sequentially display, at a display speed lower than an actual time, the still image data, a selection unit which selects one of a plurality of image data displayed on the display unit, and a recording unit which records the selected image data.

5 Claims, 5 Drawing Sheets

FOREIGN PATENT DOCUMENTS

| | | |
|---|---|---|
| JP | 2005-94133 A | 4/2005 |
| JP | 2006-140862 A | 6/2006 |
| JP | 2006-140892 A | 6/2006 |
| JP | 2006-253768 A | 9/2006 |
| JP | 2006-254358 A | 9/2006 |
| JP | 2006-270868 A | 10/2006 |
| JP | 2007-258862 A | 10/2007 |
| JP | 2008-54177 A | 3/2008 |
| JP | 2008-085689 A | 4/2008 |

OTHER PUBLICATIONS

Japanese Office Action dated Apr. 20, 2010 and English translation thereof issued in counterpart Japanese Application No. 2008-170421.
Korean Office Action dated Jun. 8, 2011 (and English translation thereof) in counterpart Korean Application No. 10-2009-0058884.
Japanese Office Action dated May 15, 2012 (and English translation thereof) in counterpart Japanese Application No. 2011-092017.

* cited by examiner

IMAGE SENSING APPARATUS AND STORAGE MEDIUM

CROSS-REFERENCE TO RELATED APPLICATIONS

This application is based upon and claims the benefit of priority from prior Japanese Patent Application No. 2008-170421, filed Jun. 30, 2008, the entire contents of which are incorporated herein by reference.

BACKGROUND OF THE INVENTION

1. Field of the Invention

The present invention relates to an image sensing apparatus suited to shooting, for example, a fast-moving object, and a storage medium.

2. Description of the Related Art

There has conventionally been proposed a technique of easily extracting a representative frame which reflects the user intention in movie shooting by a digital camera, as disclosed in patent reference 1: Jpn. Pat. Appln. KOKAI Publication No. 2006-253768. According to the technique in patent reference 1, before the user presses a still image recording button or when image data shot in successive periods are to be compressed into movie data, the number of I (Intra)-pictures capable of generating a still image independently of preceding and succeeding frames is increased from that in normal movie shooting.

According to this technique, movie data to undergo slow-motion playback or the like is formed from images shot during a predetermined period (to be referred to as an "I-picture increasing period" hereinafter) before the user presses the still image recording button.

If the user presses the still image recording button with a delay of the I-picture increasing period or more from the timing to shoot image data the user wants, the generated movie data does not contain the image he wants.

However, user operation often misses the timing to capture movie data the user wants.

It is an object of the present invention to provide an image sensing apparatus capable of easily adjusting the capturing start timing of a series of still image data having a limited time width without missing the shooting timing the user wants even for a quickly moving object, and a storage medium.

BRIEF SUMMARY OF THE INVENTION

According to an aspect of the invention, there is provided an image sensing apparatus comprising: an image sensing unit which shoots an object image to sequentially generate still image data; a holding unit which accumulates and holds a plurality of still image data obtained by the image sensing unit; a display unit which displays the still image data held in the holding unit; a setting unit which sets a predetermined state as a start timing of shooting by the image sensing unit; a determination unit which determines whether the predetermined state set by the setting unit has been obtained; a shooting control unit which causes the image sensing unit to start shooting when the determination unit determines that the predetermined state has been obtained; a display control unit which causes the display unit to sequentially display, at a display speed lower than an actual time, still image data held in the holding unit in shooting started by the shooting control unit; a selection unit which selects one of a plurality of image data displayed on the display unit; and a recording unit which records the image data selected by the selection unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention which is applied to a digital camera for shooting a still image will now be described with reference to the accompanying drawing.

Figure 1:
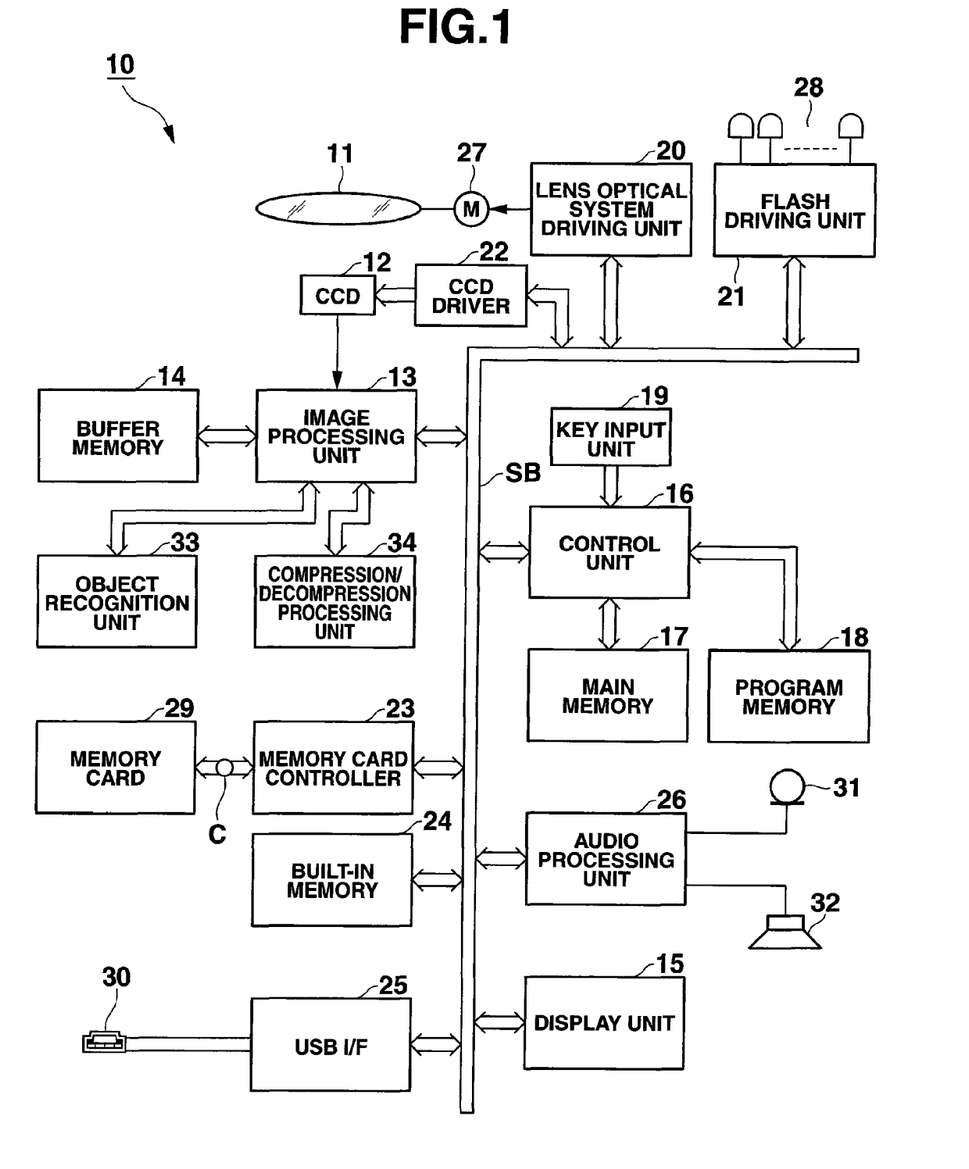
FIG. 1 is a block diagram showing the schematic arrangement of the functional circuit of a digital camera according to an embodiment of the present invention.

FIG. 1 shows the circuit arrangement of a digital camera 10 according to the embodiment. Referring to FIG. 1, the optical image of an object is formed via a lens optical system 11 on the image sensing surface of a CCD 12 serving as a solid-state image sensor.

In the monitoring state, an image signal obtained from the image sensed by the CCD 12 is sent to an image processing unit 13. The image processing unit 13 executes correlated double sampling, automatic gain control (AGC), and analog-to-digital conversion to convert the image signal into digital image data. Then, the image processing unit 13 performs color processes including pixel interpolation and y correction for the digital image data. A buffer memory 14 temporarily holds the processed image data.

The image data held in the buffer memory 14 is read out to the image processing unit 13, sent to a display unit 15 via a system bus SB, and displayed as a monitor image.

A control unit 16 comprehensively controls all these operations. The control unit 16 includes a CPU, and is connected to a main memory 17 and program memory 18. The main memory 17 is formed from a synchronous DRAM (SDRAM). The program memory 18 is formed from an electrically erasable nonvolatile memory which stores operation programs including a recording control program in a shooting mode (to be described later), permanent data, and the like.

The control unit 16 reads out a necessary program, data, and the like from the program memory 18, and temporarily stores them in the main memory 17 upon expansion. During this, the control unit 16 controls the overall digital camera 10.

The control unit 16 executes various control operations in correspondence with a key operation signal directly input from a key input unit 19. The control unit 16 is connected via the system bus SB to a lens optical system driving unit 20, flash driving unit 21, CCD driver 22, memory card controller 23, built-in memory 24, Universal Serial Bus (USB) interface 25, and audio processing unit 26, in addition to the image processing unit 13 and display unit 15.

The key input unit 19 includes a power key, shutter button, shooting mode key, playback mode key, menu key, cursor ("↑", "→", "↓", and "←") keys, set key, scene programming key, camera shake correction key, and face recognition function key.

The lens optical system driving unit 20 receives a control signal from the control unit 16 to control the rotation of a lens motor (M) 27. The lens motor 27 is coupled to some of lenses, e.g., a focusing lens and zoom lens which configure the lens optical system 11. As the lens motor 27 rotates, the focusing lens and zoom lens move along the optical axis.

In still image shooting, the flash driving unit 21 receives a control signal from the control unit 16 to turn on and drive a flash unit 28 in synchronism with the shooting timing. The flash unit 28 includes a plurality of white high-intensity LEDs.

The memory card controller 23 is connected to a memory card 29 via a card connector C. The memory card 29 is a recording memory for image data that is detachably mounted in the digital camera 10 and serves as the recording medium of the digital camera 10. The memory card 29 incorporates a flash memory serving as a nonvolatile memory electrically erasable for each block, and its driving circuit.

The built-in memory 24 is an image recording memory permanently mounted in the digital camera 10 separately from the detachable memory card 29. The built-in memory 24 similarly includes a flash memory serving as a nonvolatile memory electrically erasable for each block, and its driving circuit.

When the memory card 29 is not mounted, the built-in memory 24 functions as the recording medium of the digital camera 10 to record image data and the like. When the memory card 29 is mounted, it is preferentially used.

Image data and the like can be arbitrarily copied and moved between the memory card 29 and the built-in memory 24.

The USB interface 25 controls reception/transmission of data when connected to an external device (e.g., personal computer) of the digital camera 10 via a USB connector 30.

The audio processing unit 26 includes a sound source circuit such as a PCM sound source. When recording audio data, the audio processing unit 26 digitizes an audio signal input from a microphone 31 arranged on the front surface of the housing of the digital camera 10. The audio processing unit 26 compresses the digital data into a predetermined data file format such as moving picture experts group-4 advanced audio coding (AAC), creating an audio data file. The audio processing unit 26 sends the audio data file to the memory card 29 or built-in memory 24.

When playing back audio data, the audio processing unit 26 decompresses an audio data file read out from the memory card 29 or built-in memory 24, and converts the decompressed audio data into an analog signal. The audio processing unit 26 drives a loudspeaker 32 attached to the rear surface of the digital camera 10 to amplify the analog signal and output the amplified one.

The image processing unit 13 includes an object recognition unit 33 and compression/decompression processing unit 34.

The object recognition unit 33 executes various kinds of recognition processes for an object in image data. For example, the object recognition unit 33 performs face recognition by extracting an edge and face feature points from image data held in the buffer memory 14 to create a face graph. Also, the object recognition unit 33 calculates the moving amount between image frames of an object image as a motion vector.

When shooting an image in response to the shutter button operation of the key input unit 19, the compression/decompression processing unit 34 greatly reduces the data amount of image data to be held in the buffer memory 14 by performing data compression processing such as discrete cosine transformation (DCT) or Huffman coding for a predetermined data file format such as the Joint Photographic Experts Group (JPEG) format.

The memory card 29 or built-in memory 24 records an image data file created by the compression/decompression processing unit 34.

In the playback mode, the compression/decompression processing unit 34 executes decompression processing to decompress image data read out from the memory card 29 or built-in memory 24 in procedures reverse to those in recording, thereby obtaining image data of an original size. Then, the buffer memory 14 holds the obtained image data. The display unit 15 executes playback display based on the image data held in the buffer memory 14.

An operation in the embodiment will be explained.

Any operation in the embodiment is executed when the control unit 16 reads out an operation program, permanent data, and the like stored in the program memory 18 to expand them in the main memory 17. The operation program and the like are stored in the program memory 18 in the manufacture of the digital camera 10, or installed and held in it after downloading them from an external device connected via the USB interface 25 and USB connector 30.

In the description of the operation in the embodiment, a shutter button, which is one of the keys of the key input unit 19, is assumed to have two operation stokes.

In normal still image shooting, the digital camera 10 performs an auto focus (AF) operation and auto-exposure (AE) operation to lock the focus position, aperture value, and shutter speed in response to a so-called half-stroke which is an operation stroke of the first stage to press the shutter button halfway with a slight resistance.

Then, the digital camera 10 shoots a still image in response to a so-called full stroke which is an operation stroke of the second stage to press the shutter button to the bottom without temporarily canceling the shutter button operation from the half-stroke. The memory card 29 or built-in memory 24 records the shot image data.

The following operation example is directed not to the normal still image shooting but mainly to a shooting operation called slow live shooting.

In slow live shooting, a plurality of still image data are shot continuously to hold a series of continuously shot images in the buffer memory 14. The display unit 15 sequentially displays the still image data held in the buffer memory 14 at a speed much lower than the shooting speed. When the user selects one image in accordance with the display timing, the memory card 29 records only the selected still image data.

The number of continuously shootable still image data is determined by the capacity of the buffer memory 14, and an image size and image quality set at that time. The user can arbitrarily set a continuous shooting speed for a series of images within a predetermined range as the frame rate such as 60 frames/second.

Figure 2:
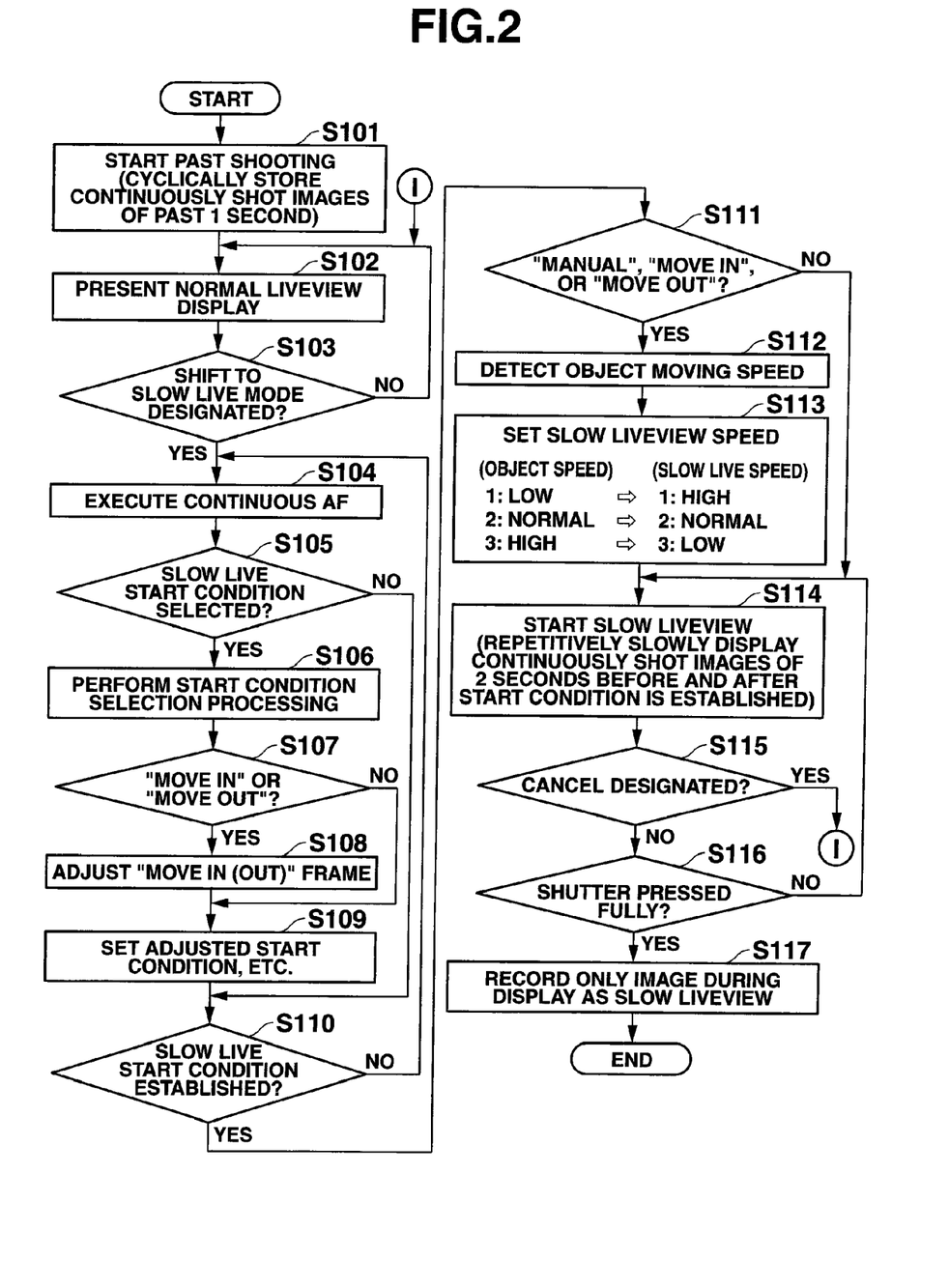
FIG. 2 is a flowchart showing the contents of shooting processing mainly in a slow live mode according to the embodiment.

FIG. 2 shows the processing contents of slow live shooting. The control unit 16 executes this processing by expanding, in the main memory 17, an operation program read out from the program memory 18.

At the beginning of the processing, the control unit 16 starts past shooting to cyclically store continuously shot image data of a predetermined past time (e.g., 1 second) in the buffer memory 14 regardless of the shutter button operation of the key input unit 19 (step S101).

At the start of past shooting, new still image data are written in the buffer memory 14. At the same time, the oldest still image data is erased. This operation is repetitively executed to always store continuously shot images of immediately past 1 second.

At the start of past shooting, the display unit 15 starts normal liveview display to display in real time the contents of the latest still image data stored in the buffer memory 14 (step S102).

Based on whether the user has done a predetermined key operation to the key input unit 19, the control unit 16 determines whether he has designated a shift from the normal liveview display to a slow live mode (step S103). If NO in step S103, the sequence returns to the process in step S102.

The processes in steps S102 and S103 are repetitively executed in the above-described way during the normal liveview display until the user designates a shift to the slow live mode.

If the user designates a shift to the slow live mode by a predetermined key operation to the key input unit 19 using a combination of the menu key, cursor ("↑", "→", "↓", and "←") keys, and set key, the control unit 16 detects it in step S103 and starts a continuous AF operation (step S104).

In the continuous AF operation, the AF operation is executed continuously without locking the in-focus position, so as to keep even a moving object in focus.

In the continuous AF operation, the control unit 16 determines whether the user has done a key operation to newly select a slow liveview start condition (step S105).

If the user has not done this key operation, the control unit 16 determines whether a preset slow liveview start condition has already been established (step S110).

If no slow liveview start condition has been established, the sequence returns again to the process in step S104.

While repetitively executing the processes in steps S104, S105, and S110, the sequence waits until the user performs a key operation to newly select a slow liveview start condition or the slow liveview start condition is established.

If the user performs a key operation to newly select a slow liveview start condition, the control unit 16 detects it in step S105, and the sequence shifts to a process to select a slow liveview start condition (step S106).

Figure 3:
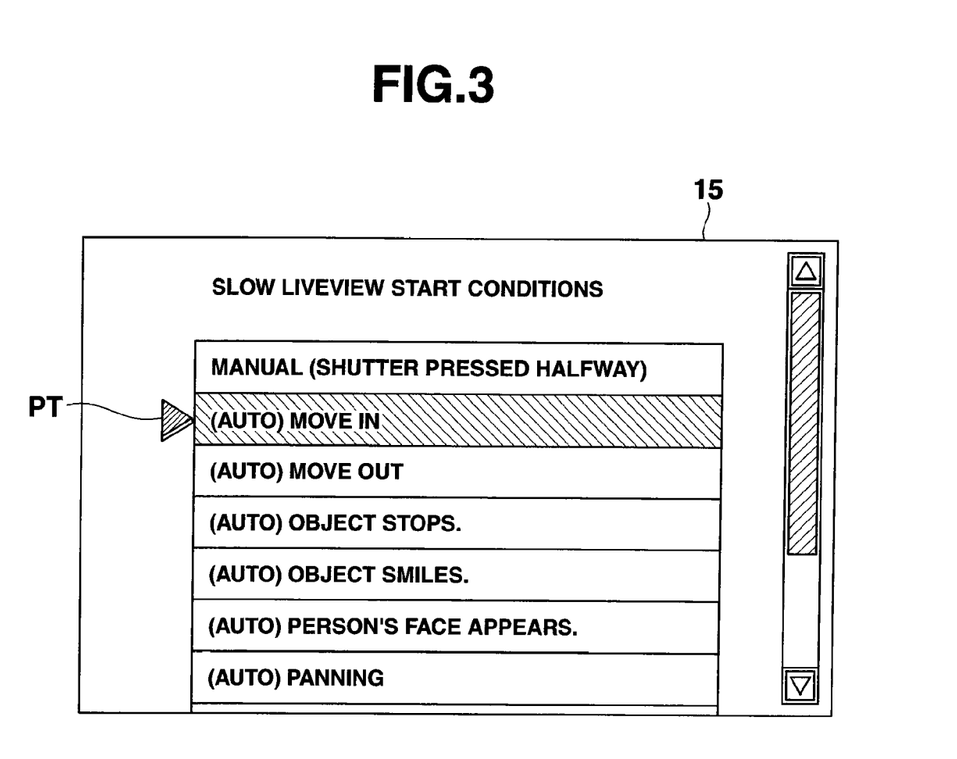
FIG. 3 is a view exemplifying a slow liveview start condition setting display window according to the embodiment.

FIG. 3 exemplifies a slow liveview start condition selection window displayed on the display unit 15. In FIG. 3, a plurality of conditions are prepared in advance, including "manual", "move in", "move out", "object stops", "object smiles", "person's face appears", and "panning".

"Manual" starts the slow liveview when the user presses the shutter button halfway.

Figure 4A:
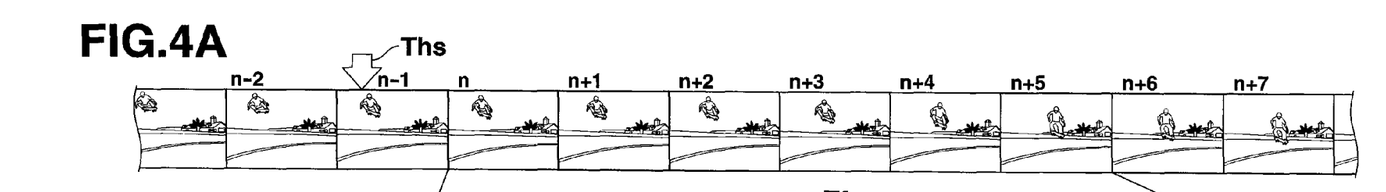
FIGS. 4A to 4C are views showing a basic sequence to select one still image data when "manual" is set as a slow liveview start condition according to the embodiment.
Figure 4B:
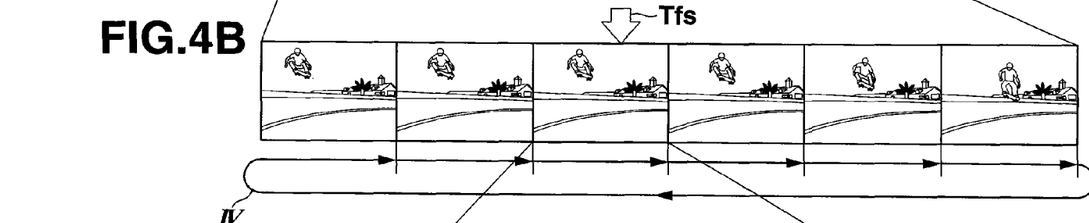
Figure 4C:
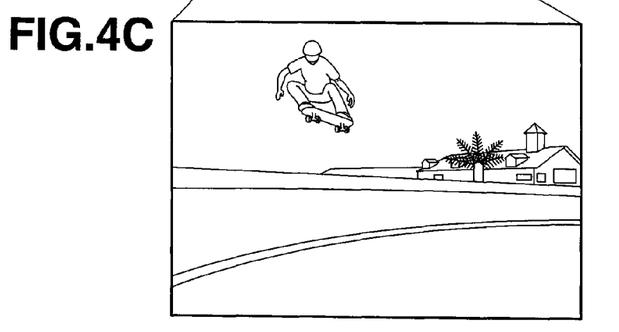

FIGS. 4A to 4C show a basic sequence to select one still image data when "manual" is set as the slow liveview start condition. The CCD 12 is assumed to have sensed a series of images, as represented in FIG. 4A. In FIG. 4A, "n−2", "n−1", . . . , and "n+7" represent the frame numbers of image frames.

If the user presses the shutter button halfway at a timing Ths when the image frame "n−1" is shot, the buffer memory 14 temporarily stores, as continuously shot images, image data of a predetermined number of frames starting from that of the image frame "n" immediately after the image frame "n−1".

For descriptive convenience, the buffer memory 14 stores image data of a total of six frames up to the image frame "n+5". In practice, when the frame rate is 30 frames/second, the buffer memory 14 stores image data of 30 frames, i.e., 1 second.

Simultaneously when the buffer memory 14 stores image data of a predetermined number of frames, image data are read out from the buffer memory 14 at a frame rate of, e.g., 1 frames/second much slower than an actual time, and sequentially displayed on the display unit 15.

In FIG. 4B, temporally successive image data of six frames are cyclically displayed as indicated by an arrow IV.

While cyclically displaying continuously shot images of a predetermined number of frames, i.e., a predetermined time to allow the user to visually recognize the contents of each image, the sequence waits until he presses the shutter button fully subsequently to the half-stroke of the shutter button.

In FIG. 4B, the user presses the shutter button fully at a timing Thf when the image frame "n+2" is displayed. The control unit 16 determines that the user has selected still image data he wants by the full stroke of the shutter button. Then, the compression/decompression processing unit 34 compresses only the still image data of the image frame "n+2", as represented in FIG. 4C. The memory card 29 or built-in memory 24 records the compressed still image data.

In the basic operation of FIGS. 4A to 4C, when the slow liveview starts in response to the half-stroke of the shutter button, still image data of the image frame "n" immediately after the timing Ths is positioned at the start of a series of continuously shot image data. In the embodiment, as described in step S101, the past shooting function runs to always store continuously shot images of a predetermined time in the buffer memory 14.

For this reason, the buffer memory 14 stores images of a total of 2 seconds, i.e., 1 second before the timing Ths when the shutter button was pressed halfway and 1 second after it. The slow liveview display also starts sequentially from image data of 1 second before the timing Ths when the shutter button was pressed halfway.

Referring back to FIG. 3, "(auto)" is added to the starts of the item names of the remaining start conditions "move in", "move out", "object stops", "object smiles", "person's face appears", and "panning". As is apparent from "(auto)", these conditions are set to automatically start the slow liveview upon a temporal change of an object in still image data obtained by shooting regardless of a key operation by the user.

The conditions "move in" and "move out" are to detect the contact of an object with a virtual frame in a monitor image displayed on the display unit 15 when the object externally moves in the frame or internally moves out of it. Upon the detection, the slow liveview starts.

Figure 5:
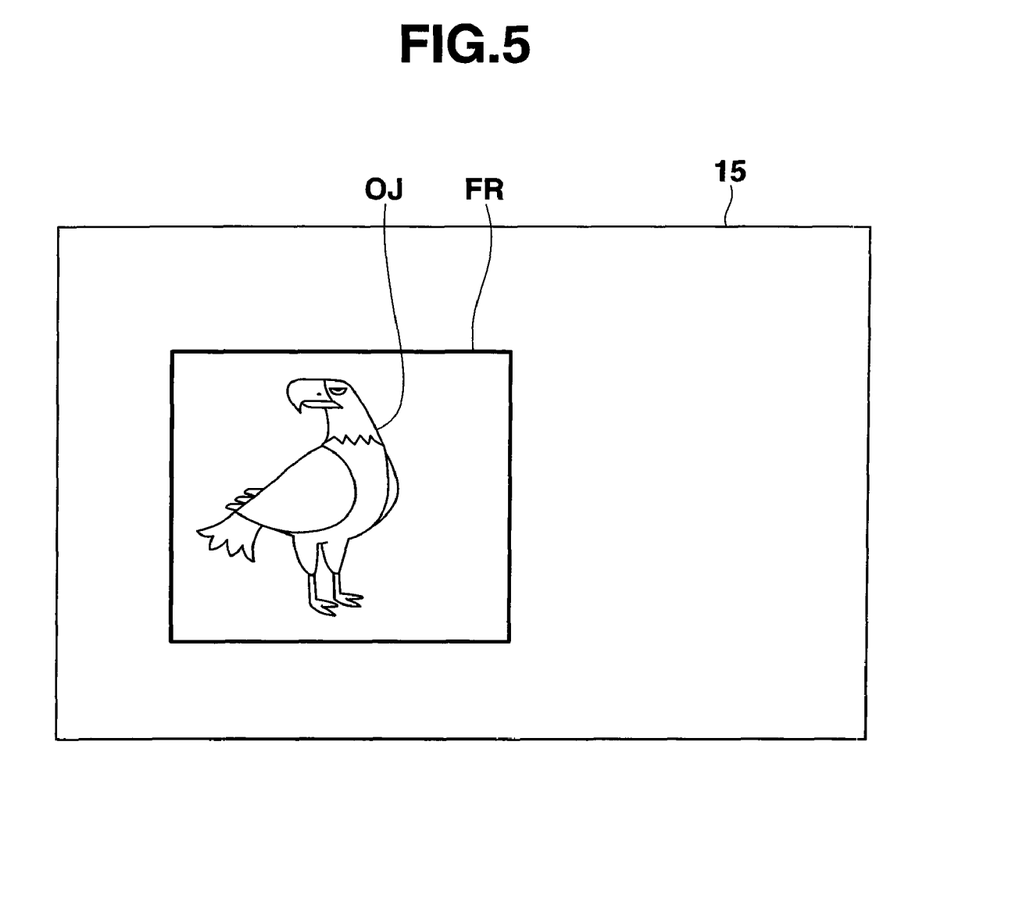
FIG. 5 is a view exemplifying a display window when "move out" is set as a slow liveview start condition according to the embodiment.

FIG. 5 exemplifies a monitor image on the display unit 15 at the "move out" setting. A rectangular frame FR is displayed slightly leftward from the center of the display unit 15. The rectangular frame FR contains a bird (eagle) as an object OJ. For example, when the object OJ moves and comes into contact with the rectangular frame FR on the display unit 15, the slow liveview starts automatically.

The condition "an object stops" is to calculate the motion vector between temporally adjacent image frames. When the total motion vector of the entire image becomes less than or equal to a predetermined value, it is determined that the object stops, and the slow liveview starts automatically.

The condition "an object smiles" is to perform face recognition processing for image data using the object recognition unit 33, thereby extracting a person's face and analyzing the facial expression. When the analysis result exceeds a preset index to determine that the expression is a smile, the slow liveview starts automatically.

The condition "person's face appears" is to perform face recognition processing for image data using the object recognition unit 33. When a person's face, which has not been extracted before, is extracted, the slow liveview starts automatically.

The condition "panning" is to calculate the motion vector between temporally adjacent image frames at, e.g., each of the center and periphery of image data. When the magnitude of the motion vector at the periphery exceeds a preset index much more than that of the motion vector at the center, the slow liveview starts automatically.

If the slow liveview start condition selection processing ends in step S106 of FIG. 2, the control unit 16 determines whether the selected start condition is either "move in" or "move out" (step S107).

Only when the control unit 16 determines that the selected start condition is "move in" or "move out", the size and position of the frame FR displayed on the display unit 15 are adjusted (step S108).

After that, the control unit 16 sets all the selected slow liveview start condition, the adjustment contents of the frame FR especially for the start condition "move in" or "move out", and the like (step S109).

The sequence advances to step S110 to determine whether the newly set slow liveview start condition has been established. If no slow liveview start condition has been established, the sequence returns again to the process in step S104.

The processes in steps S104, S105, and S110 are repetitively executed. The sequence waits until the user performs a key operation to newly select a slow liveview start condition or the slow liveview start condition is established. If the set slow liveview start condition is established, the control unit 16 detects it in step S110.

In this case, the control unit 16 determines whether the set slow liveview start condition is "manual", "move in", or "move out" (step S111).

If the control unit 16 determines that the set start condition is "manual", "move in", or "move out", it calculates the object moving speed as the magnitude (number of pixels) of a motion vector between current image data and image data which has been shot immediately before the current image data and is stored in the buffer memory 14 (step S112).

That is, when the control unit 16 determines that the set start condition is "manual", it calculates the object moving speed by comparing an image frame obtained when the user pressed the shutter button halfway, and an image frame shot immediately before it.

When the control unit 16 determines that the set start condition is "move in" or "move out", it calculates the object moving speed by comparing an image frame shot when the contact of the object with the frame was detected, and an image frame shot immediately before it.

The control unit 16 sets the slow liveview speed, e.g., the display time per image frame from the calculated object moving speed (step S113).

This calculation uses preset moving speed thresholds PX1 and PX2 (PX1<PX2). When an object moving speed PXn is lower than the threshold PX1, it is determined that the object moves slowly (=moving distance in image data is short [number of pixels is small]. Thus, the slow liveview speed is set as high as, e.g., 0.5 seconds per image frame.

When the object moving speed PXn is greater than or equal to the threshold PX1 and lower than the threshold PX2, it is determined that the object moves at a normal speed, and the slow liveview speed is set to a normal speed of, e.g., 1 second per image frame.

When the object moving speed PXn is greater than or equal to the threshold PX2, it is determined that the object moves quickly (=moving distance in image data is long [number of pixels is large]. Hence, the slow liveview speed is set as low as, e.g., 2 sec per image frame.

Then, the slow liveview starts using a series of still image data stored in the buffer memory 14. At the set speed, the display unit 15 cyclically displays still image data of a total of 2 seconds, i.e., 1 second before the timing when the start condition was established and 1 second after it (step S114).

At this time, the display unit 15 provides on screen display (OSD) of a guide message such as "Cancel→Menu/select→Full Stroke of Shutter" The OSD prompts the user to perform a key operation to select or cancel an image.

While executing the slow liveview display, the control unit 16 determines whether the user has done a cancel key operation using the key input unit 19 (step S115).

If the user has not performed the cancel key operation, the control unit 16 determines whether the user has pressed the shutter button fully to select an image (step S116).

If the user has not pressed the shutter button fully to select an image, either, the sequence returns to step S114.

While repetitively executing the processes in steps S114 to S116 to present the slow liveview display, the sequence waits until the user performs a key operation to cancel or select an image.

If the user performs a cancel key operation during the slow liveview display, the control unit 16 detects it in step S115, and the sequence returns again to the processes from step S102 in preparation for the next shooting.

If the user presses the shutter button fully to select an image during the slow liveview display, the control unit 16 detects it in step S116, and selects still image data displayed at this time in the slow liveview. The compression/decompression processing unit 34 compresses the selected still image data, and the memory card 29 or built-in memory 24 records the compressed still image data (step S117). Then, a series of slow live shooting operations ends.

As described above, the embodiment can easily adjust the capturing start timing of a series of still image data having a limited time width without missing the shooting timing the user wants even for a quickly moving object.

Especially in the embodiment, a temporal change of an object in a series of still image data obtained by shooting is detected to start the slow liveview. The embodiment can therefore set a capturing start timing directly linked to a still image shooting timing the user wants.

In this case, the slow liveview starts while the object is always in focus by executing the continuous AF operation. This can eliminate an AF time lag at the start of the slow liveview, achieving a smoother operation.

As described as "move in" and "move out" in the embodiment, entrance of an object image into a predetermined area in still image data and exit of an object image from a predetermined area can be set as slow liveview start conditions. This allows starting the slow liveview at an appropriate timing even when shooting an object which moves at high speed so that it is difficult to keep capturing the object in the shooting range.

In slow live shooting, the display speed of the slow liveview is controlled in accordance with the object moving speed. A proper display speed can be set easily and automatically, and the next shooting can be prepared for quickly.

Since the stop of an object image can be set as a slow liveview start condition, even an object whose motion is hardly predicted can be easily coped with.

Further, a combination of face recognition and expression detection of an object, which have become fully practical these days, can be set as a slow liveview start condition. When the user wants to shoot the smile of a specific person, a still image he wants can be reliably captured though the apparatus automatically selects the shooting timing.

The appearance of a person's face in the shooting range can be set as a slow liveview start condition. Even an object whose motion is hardly predicted can be easily coped with, canceling an operation delay when the object suddenly enters the shooting range.

In addition, the embodiment executes past shooting to capture even still images of a predetermined time immediately before the start of the slow liveview. Even if the slow live shooting start timing delays, an image the user wants can be shot without missing the desired timing.

In the embodiment, a temporal change of an object in a series of still image data obtained by shooting is detected to start the slow liveview. However, the present invention is not exclusive to this. For example, it can also be set as a predetermined state a case in which a temporal change of an acoustic characteristic of a sound acquired using the microphone 31 and audio processing unit 26, e.g., a relative sound pressure has reached a predetermined threshold, or a case in which a voice of a predetermined frequency band such as one or a plurality of bands is detected.

For example, a pistol sound at the start of a footrace is set as a slow live shooting start timing. In this way, the present invention is applied to a wider range of purposes.

In the embodiment, the present invention is applied to a digital camera. However, the present invention is not limited to this, and is also applicable to a video movie camera capable of shooting a still image, a cell phone having a camera function, a personal digital assistant (PDA), or a compact electronic device such as a mobile personal computer equipped with a web camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image sensing apparatus comprising:
    image sensing means for serially shooting in time and sequentially generating still image data;
    holding means for holding a plurality of still image data generated sequentially by the image sensing means;
    displaying means for sequentially displaying the still image data held by the holding means together with a frame;
    first detecting means for detecting a contact of an object included in the still image data displayed sequentially by the displaying means, with the frame;
    second detecting means for detecting a speed of the object if the contact is detected by the first detecting means;
    display speed controlling means for controlling a speed of sequentially displaying the still image data by the displaying means to be lower than an image sensing speed of the image sensing means, based on the speed of the object detected by the second detecting means, such that the speed of sequentially displaying the still image data is set to be one of a plurality of different speeds based on the speed of the object detected by the second detecting means;
    third detecting means for detecting an external operation when the still image data are sequentially displayed at the display speed controlled by the display speed controlling means; and
    recording means for recording the still image data displayed by the display means when the external operation is detected by the third detecting means.

2. The apparatus of claim 1, further comprising focusing means for focusing the object.

3. A method of controlling image sensing, the method comprising:
    serially shooting in time and sequentially generating still image data;
    holding a plurality of the sequentially generated still image data in a first memory;
    sequentially displaying the held still image data together with a frame on a display unit;
    detecting contact of an object included in the sequentially displayed still image data with the frame;
    detecting a speed of the object if the contact is detected;
    controlling a speed of sequentially displaying the still image data to be lower than a shooting speed of the serial shooting, based on the detected speed of the object, such that the speed of sequentially displaying the still image data is set to be one of a plurality of different speeds based on the detected speed of the object;
    detecting an external operation when the still image data are sequentially displayed at the controlled display speed; and
    recording the still image data displayed on the display unit in a second memory when the external operation is detected.

4. A non-transitory computer readable storage medium having a program stored thereon which controls a computer in an image sensing apparatus comprising an image sensing unit, a first memory, a display unit, and a second memory to function as elements including:
    image sensing means for using the image sensing unit to serially shoot in time and sequentially generate still image data;
    holding means for holding a plurality of still image data generated sequentially by the image sensing means, in the first memory;
    displaying means for performing control to sequentially display the still image data held by the holding means together with a frame on the display unit;
    first detecting means for detecting a contact of an object included in the still image data displayed sequentially by the displaying means, with the frame;
    second detecting means for detecting a speed of the object if the contact is detected by the first detecting means;
    display speed controlling means for controlling a speed of sequentially displaying the still image data by the displaying means to be lower than an image sensing speed of the image sensing means, based on the speed of the object detected by the second detecting means, such that the speed of sequentially displaying the still image data is set to be one of a plurality of different speeds based on the speed of the object detected by the second detecting means;

third detecting means for detecting an external operation when the still image data are sequentially displayed at the display speed controlled by the display speed controlling means; and recording means for performing control to record the still image data displayed on the display unit in the second memory when the external operation is detected by the third detecting means.

5. The apparatus of claim 1, wherein:

the holding means further holds, if the contact is detected by the first detecting means, still image data shot at a time when the contact is detected and during a predetermined period before and after the time when the contact is detected; and the displaying means cyclically displays the still image data during the predetermined period held by the holding means.

\* \* \* \* \*